United States Patent Office 3,446,308
Patented May 27, 1969

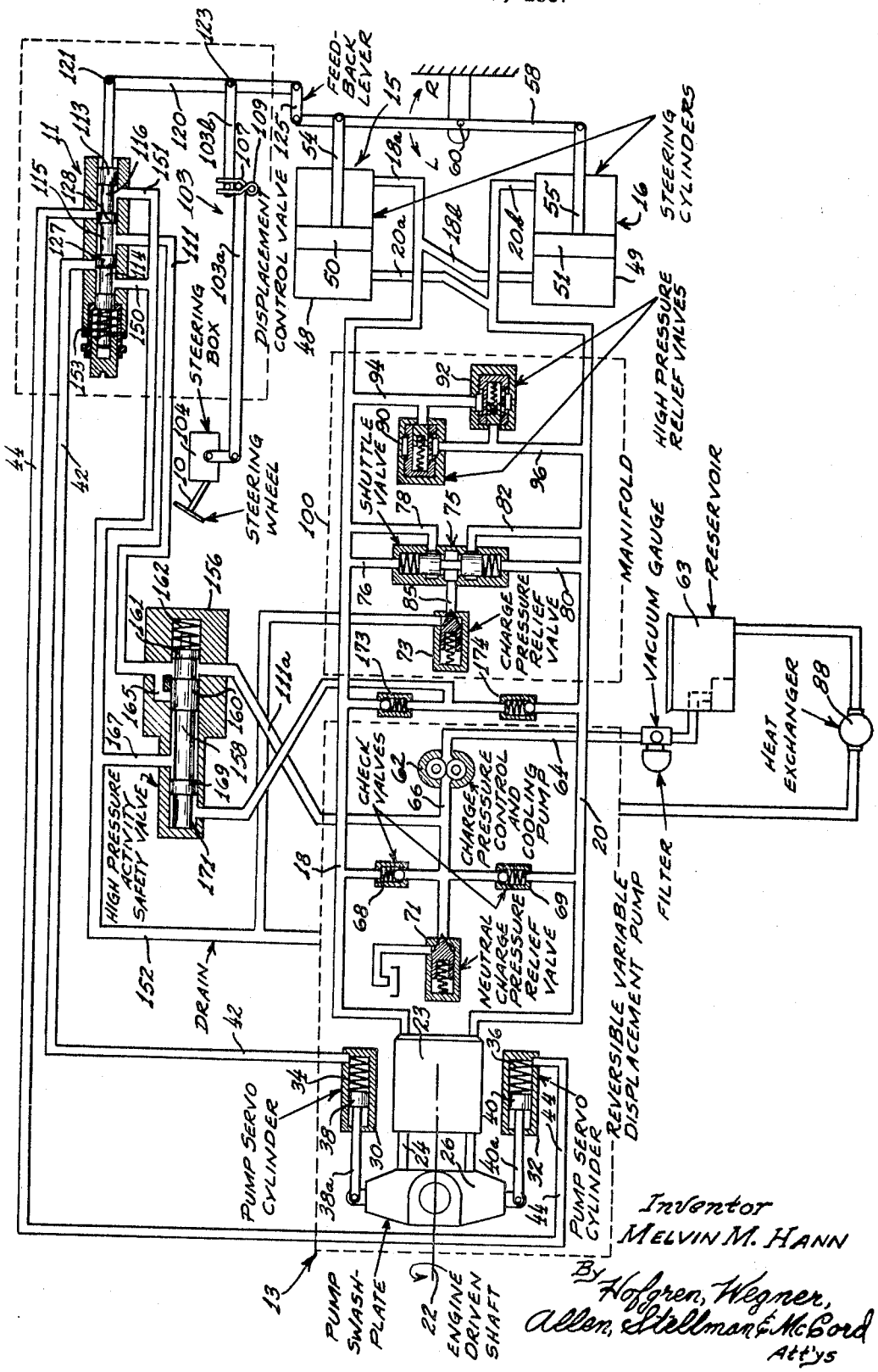

3,446,308
HYDRAULIC SYSTEM
Melvin M. Hann, Ottawa, Ill., assignor to Sundstrand Corporation, a corporation of Delaware
Filed June 19, 1967, Ser. No. 647,114
Int. Cl. B62d 5/08
U.S. Cl. 180—79.2
6 Claims

ABSTRACT OF THE DISCLOSURE

A hydraulic positioning system having a variable displacement multiple piston pump for supplying hydraulic fluid to actuators with feedback linkage from the actuators to a pump displacement control valve.

Background of the invention

In the past, hydraulic power steering systems for heavy off-the-road type vehicles have generally taken the form of a conventional servo arrangement including a manually operable servo valve connected to port fluid to one or more reciprocating piston actuators connected to drive the steering arms of the vehicles. Manual displacement of the servo valve causes fluid to be ported to the actuator to effect the desired steering direction. In such systems the operator in effect controls only the rate of change of the turn radius of a vehicle rather than the turn radius itself. That is, the amount of displacement of the servo valve itself, by the operator, controls the rate of flow of fluid to the steering actuator and thus the rate of movement of the actuator and the rate of change of vehicle turn.

It is highly desirable that the operator be able to determine the radius of turn of the vehicle by the amount he displaces the steering lever or wheel in a manner similar to a mechanical steering system.

Summary of the invention

In accordance with the present invention, a rotary cylinder block multiple piston steering pump is provided, driven by an engine, for supplying fluid to the steering actuator or actuators. Steering is effected by controlling the displacement of the pump, and thus the flow and direction of fluid relative to the actuators. Since multiple piston hydraulic units have various forms of cams for reciprocating the pistons therein, which when adjusted vary the displacement of the hydraulic unit, it will be appreciated by those familiar with these units that so long as the cam member is displaced from its neutral position and the cylinder block is rotated, that the hydraulic unit will continue to deliver fluid. Now, since the hydraulic unit according to the present invention delivers fluid to reciprocating steering actuators, it is apparent that the cam member must be returned to a neutral position when the vehicle achieves its desired radius of turn, for if the cam member is merely stopped in some positive displacement position, the turn radius will continue to decrease although the rate of change of the turn radius will remain constant in this condition. A servo valve initially positioned by the operator through the steering wheel ports fluid to a control motor for positioning the pump cam and thereby selecting the pump displacement.

In order to return the hydraulic unit cam member to its neutral position when the vehicle reaches the desired turn radius in accordance with the operator's displacement of the steering wheel, a feedback linkage (indicating actual steering radius) is provided from the actuators or steering pivot arms which neutralizes the signal supplied to the control by the operator through the steering wheel which positions the servo valve. This moves the pump cam to its zero displacement position arresting the steering actuators when the desired steer radius is attained.

A high pressure safety valve is provided for reducing the displacement of the pump to zero when an excessive pressure exists in either of the conduits interconnecting the pump and the actuator. This is important, for when the pistons in the actuators reach their end of stroke the pressure build up is significant and a conventional high pressure relief valve would cause the hydraulic fluid to quickly overheat. With the present arrangement, when the pistons reach the end of their stroke, the pump is returned to neutral and flow through the conduits stops.

Description of the preferred embodiment

Referring to the drawing in more detail, the present power steering system is seen to include generally a manually operable steering wheel 10, a servo valve 11, an engine driven variable displacement pump 13, and steering cylinders or actuators 15 and 16. Steering cylinders 15 and 16 are adapted to be connected to drive the steering pivot arm of a vehicle to effect turning of the vehicle wheels or in some articulated vehicles to effect the pivotal displacement of the tractor with respect to trailer. The operator's movement of the steering wheel 10 causes servo valve 11 to vary the displacement of pump 13 supplying motive fluid to the steering cylinders 15 and 16 to effect vehicle turning.

The pump 13 and the steering cylinders or actuators 15 and 16 are hydraulically interconnected by conduits 18 and 20, to establish a closed circuit for pumping hydraulic fluid from the pump 13 to the steering cylinders 15 and 16 and returning fluid to the pump. Pump 13 is driven through shaft 22 by the prime mover of the associated vehicle and is of the axial piston type having a rotatable cylinder block 23 with a plurality of cylinders (not shown) in annular array and reciprocal pistons 24 slidable in the cylinders. A variable angle reversible cam or swashplate 26 is provided for reciprocating the pistons 24 and varying the displacement of the hydraulic unit 13 as desired. Cam member 26 is movable from a neutral position shown, wherein the pistons 24 will not reciprocate and no flow will be produced from the pump, to maximum displacement positions on either side of neutral. Displacement of the cam 26 in one direction will cause one of the conduits 18 and 20 to be pressurized, while displacement in the other direction will cause the other conduit to be pressurized in a well known fashion.

For positioning the pump cam 26, two pump control cylinders 30 and 32 are provided. These cylinders house centering springs 34 and 36, respectively, and include pistons 38 and 40 on rods 38a and 40a, respectively, which are pivotally secured to the cam member for positioning the same in response to the supply of control fluid to the cylinders through conduits 42 and 44, respectively. The springs normally act through the pistons to position the pump swashplate as shown in a position of minimum or zero displacement so that there is no positive output from the pump. The control cylinders 30 and 32 are conventional single action type so that the influx of fluid under pressure in one cylinder will cause the swashplate to tilt or pivot in a given direction, and the influx of fluid under pressure in the opposite cylinder will cause reverse tilting so that movement in opposite directions may be imparted to the steering cylinders 15 and 16 and thus effect vehicle steering movement to either the right or left from straight tracking.

The steering actuators 15 and 16 include cylinders 48, 49 with pistons 50, 51 slidable therein rigidly connected to piston rods 54, 55. The rods 54 and 55 are pivotally secured to a suitable steering arm 58, in turn pivotally mounted at 60 to a portion of the vehicle frame.

It should be understood that the steering arm 58 is represented only diagrammatically in the drawing and may be a standard portion of the steering mechanism of the vehicle. For purposes of the present description, it is assumed that the steering arm 58 is in a neutral or straight ahead position as shown in the drawing and that clockwise movement of the arm from the position shown will cause right steering of the vehicle and that counterclockwise movement will cause left steering.

Branch passages 18a and 18b connect conduit 18 to the right side of cylinder 48 and the left side of cylinder 49 so that when conduit 18 is pressurized, counterclockwise movement of the steering arm 58 will occur causing left steering. Similarly, branch passages 20a and 20b connect conduit 20 to the left side of the cylinder 48 and the right side of cylinder 49, respectively, so that when this conduit is pressurized, right hand steering of the vehicle will result.

A positive displacement gear-type replenshing and cooling pump 62 is provided and is driven by suitable means by the engine or prime mover of the vehicle. The replenishing and cooling pump is in communication with a reservoir 63 through an intake conduit 64 for supplying replenishing and cooling fluid to the system through conduit 66. The capacity of the pump is sufficient to replace leakage fluid, to supply control fluid to the valve 11 and to supply cooling fluid to the circuit in excess of that required for the aforementioned purposes to maintain the parts at a reasonable temperature.

A pair of spring biased check valves 68 and 69 are in communication with the conduit 66 and with the conduits 18 and 20, respectively, for supplying the replenishing and cooling fluid to the low pressure side of the circuit through one check valve while the pressure in the high pressure conduit will maintain the other check valve closed. A spring biased make-up relief valve 71 communicates with the conduit 66 and serves to relieve excess fluid.

For establishing a circuit between the main line 18 or 20, that is at low pressure, and a low pressure relief valve 73, a shuttle valve 75 is provided. The shuttle valve is in communication with the conduits 18 and 20 by means of the conduits 76, 78, 80, and 82, and provides a means for removing heated oil displaced by cooling oil supplied by replenishing pump 62. The fluid pressure in the conduits 18 and 20 acts through the conduits 76 and 80, respectively, to appropriately position the shuttle valve 75 so that communication is established from the low pressure relief valve through a conduit 85 to the low pressure side of the hydraulic circuit by means of either the conduit 78 or the conduit 82 so that the heated fluid may be drained to the reservoir 63 therefrom passing through heat exchanger 88. Shuttle valve 75 is spring centered to a closed position so that during the transition of reversing pressure in the main lines none of the high pressure oil is lost in the circuit.

The hydraulic circuit also includes over pressure relief valves 90 and 92 in communication with each of the main conduits by means of the passages 94 and 96, respectively. The valves serve to prevent abnormally high pressure in either of the two main hydraulic lines 18 and 20 by relieving the circuit of surge pressures which may occur during rapid steering movements. In response to this high pressure, the over pressure relief valves shift to dump the excess oil to the low pressure side of the hydraulic circuit. For example, when excessive pressure exists in line 18 fluid flow through conduit 94 will cause valve 90 to shunt the fluid to line 20 through conduit 96.

It should be understood that a portion of the conduits 18 and 20 as well as the charge pump 62 and valves 68, 69 and 71 may be housed within the pump 13. As it will usually be desirable to control the displacement of the pump 13 remotely from the pump and the steering cylinders 15 and 16, suitable flexible hosing may be provided for defining the hydraulic passages therebetween.

A manifold 100 (illustrated only diagrammatically) is provided for housing the valves 73, 75, 90 and 92, and the passages associated therewith, so that if desired, these elements may be positioned remotely from both the pump 13 and the steering cylinders 15 and 16.

The control for the displacement of the pump 13 includes control valve 11 and a steering control linkage 103 connected to a steering box 104. The steering box 104 is connected to the steering linkage 103 such that movement of the steering wheel 10 in one direction from straight ahead will cause movement of linkage 103 to the left, and turning of the steering wheel in the other direction will cause movement of the linkage 103 to the right. Linkage 103 consists of links 103a and 103b interconnected by the arms of spring 107 pivotally mounted on a frame member as at 109.

The control valve 11 is a spring centered four-way valve in communication with control fluid through conduits 111 and 111a. The valve includes a valve stem 113 having reduced diameter portions as at 114, 115 and 116. The valve stem is operatively associated with the steering wheel through link 120 which is pivotally connected at one end, as shown at 121, to the stem 113 and pivotally connected at an intermediate portion 123 to link 103b.

As will appear hereinafter in more detail, the valve control link 120 is also connected to the steering arm 58 by a feedback lever 125 connected to link 120 at the end thereof opposite the valve stem 113.

As shown in the drawing, the control valve 11 is in a neutral or center position so that control fluid from the charge pump by way of conduits 111 and 111a enters the valve and while capable of flowing around the reduced portion 115, it is blocked by lands 127 and 128 from passing out the valve to either conduit 42 or 44.

The lands 127 and 128 are positioned so that when the valve stem 113 is in the neutral position shown, control flow from passage 111 will be blocked and passages 42 and 44 will communicate with the casing of pump 13 through drain passages 150, 151 and 152. In this manner, when the stem 113 is placed in its neutral position by either the steering wheel or the feedback linkage arrangement, the cam centering springs 34 and 36 will move the pump to neutral arresting movement of pistons 50 and 51 to maintain the vehicle path or turn.

The spring 107 provides a yieldable connection between the steering wheel and the valve member so that excess forces applied to the steering wheel will not be transmitted to the valve member. The spring 107 will yield in response to the opposition offered by the valve stem 113 so that handle movement is not transmitted directly to the valve member. Thus, rather than permit the excessive force to be transmitted through the valve stem where it may cause damage thereto, such excess force is absorbed in the spring 107. Further, the control valve 11 is provided with a neutral centering spring assembly 153 for accurately centering the valve stem 113 in the neutral position shown when the linkage moves the stem to neutral, and in this manner, any backlash will not produce inaccuracies in the system. Furthermore, suitable means may be provided for initially restricting the rate of flow of control fluid supply to conduit 111 during initial movement of the valve stem 113 to prevent any abrupt steering movement of the vehicle.

In the operation of the present power steering system as presently described, and assuming that the operator turns the steering wheel to the right a predetermined amount, linkage 103 and link 120 will shift valve stem 113 in valve 11 to the right an amount proportional to the angular displacement of the steering wheel. Control flow from passage 111 will then be ported to line 44 across reduced stem portion 115, and line 42 will be connected to the pump casing across reduced stem portion 114, passage 150 and conduit 152. Hence, control cylinder 32 will be pressurized and control cylinder 30 depressurized causing clockwise pivotal movement of the cam 26 and flow from the pump 13 through main conduit 20. High pressure flow in main conduit 20 drives piston 50 to the right and piston 51 to the left causing the steering pivot arm 58 to pivot in a clockwise direction steering the vehicle to the right. As the arm 58 pivots in a clockwise direction it moves feedback link 125 to the right, pivoting link 120 about pivot 123 in a counterclockwise direction moving valve stem 113 towards its neutral position. The resistance of the steering box 104 prevents linkage 103 at this time from returning to the left so that pivot 123 remains stationary unless, of course, the operator moves the steering wheel to a different position. When the pivot arm arrives at the desired radius of turn, the feedback lever 125 and link 120 shift the stem 113 to its neutral position shown porting both lines 42 and 44 to the pump casing through branch passages 150 and 151. Centering springs 34 and 36 then return the pump swashplate 26 to neutral reducing the flow from the pump to zero even though rotation of the cylinder block 23 continues, thereby effectively locking the steering cylinders 15 and 16 to maintain the selected radius of turn.

The pivot points of link 120 are selected to give a suitable steering ratio.

To return the vehicle to straight ahead or infinite turn radius, the operator need merely rotate the steering wheel back to its center position which through leftward shifting of the linkage 103 will cause stem 113 to be moved to the left pressurizing line 42 and depressurizing line 44. Cam 26 will then begin pivoting counterclockwise pressurizing conduit 18 driving piston 50 to the left and piston 51 to the right back to the position shown in the drawing, and when so positioned the feedback linkage shifts the valve stem again back to the neutral position shown. Leftward steering from neutral proceeds in the same manner as that described above with respect to returning the vehicle from a right turn radius to straight ahead.

A high pressure safety valve 156 is provided for returning the pump 13 to neutral when the pistons 50 and 51 reach their end of stroke and the pump continues to displace fluid to the cylinders. In the absence of such a provision, and under these circumstances, high pressure fluid would be relieved across high pressure relief valves 90, 92 and would quickly overheat the hydraulic fluid. Valve 156 is in series with the control pressure supply conduits 111 and 111a and includes a movable valve member 158 having spaced lands 160 and 161 thereon. The valve stem is biased to the left to its normal position shown by compression spring 162. Thus, in this position, control fluid may pass from conduit 111a to 111 and hence to control valve 11. Control valve 156 has a branch passage 165 communicating with passage 111 and with the valve bore such that when the valve stem 158 and land 160 shift to the right from the position shown passage 111 will communicate with a return branch passage 167 communicating with the pump casing through drain passage 152.

The valve 156 is responsive to an excessive pressure build-up in either of the conduits 18 or 20 such as would occur when the pistons 50, 51 reach the end of their stroke and the pump 13 continues pumping thereto. Toward this end, the valve stem 158 has a piston 169 spaced from the left end thereof forming a chamber 171 in the valve. Chamber 171 communicates with the high pressure one of the conduits 18 and 20 through check valves 173 and 174, respectively. When the force of fluid acting on piston 169 exceeds the biasing force of spring 162, valve stem 158 will shift to the right causing control fluid passage 111 to communicate with the pump casing thus depressurizing whichever of the lines 42 or 44 is then communicating with passage 111. Since the other of the lines 42 and 44 then is also in communication with low pressure drain through branch passages 150 or 151, both of the control cylinders 30 and 32 are depressurized permitting the cam member 26 to return to its neutral position. Although not shown in the drawing, a further protection against bottoming of the cylinders 15 and 16 may be provided in the form of stops in the steering box 104 which limit the maximum turn (minimum turn radius) so that the feedback lever 125 will return the pump to neutral just before the steering cylinders reach their end of stroke.

I claim:

1. A fluid system for positioning a load member, comprising: a rotary multiple piston pump adapted to be driven by a prime mover, said pump including an adjustable cam member movable from a neutral position for varying the displacement thereof, motor means connected to drive said load, conduit means for delivering fluid from said pump to said motor means, manually controllable means for moving said cam member from its neutral position to thereby drive the load, and feedback means responsive to the position of said load for biasing said manually controllable means in a direction to return said cam member to neutral when the load reaches its desired position, said manually controllable means including a servo valve having a fluid operable control means connected to drive said cam member, said servo valve having a valve member movable from a neutral position in either direction, said valve member in neutral connecting said fluid operable means to a low pressure discharge, and means biasing said cam member to a neutral position whereby the cam member will move toward its neutral position under the influence of the biasing means when the valve is in neutral, said valve member when displaced from neutral porting fluid to said fluid operable means to move the cam member in a direction from neutral corresponding to the direction of movement of said valve member.

2. A fluid system as defined in claim 1, wherein said manually controllable means includes linkage means for displacing said valve member from its neutral position in accordance with the desired final position of the load, said feedback means including feedback linkage adapted to be driven by the load and connected to return the valve member to neutral when the load reaches the desired final position whereby the pump will cease delivery of fluid to the motor means and the load will stop.

3. A vehicular power steering system, comprising: a rotatable multiple piston pump adapted to be driven by an engine, a cam member adjustable from neutral to vary the displacement of said pump, fluid operable means for positioning said cam member, at least one hydraulic cylinder and reciprocating piston actuator adapted to be connected to position steering members in the vehicle to vary the radius of turn of the vehicle, conduit means for delivering fluid from the pump to said actuator, a steering wheel means movable from a straight ahead position to left or right positions, valve means including a valve member movable from a neutral position in both directions to port fluid relative to said fluid operable means thereby to control the direction of movement of said cam member from neutral, said valve member in the neutral position connecting said fluid operable means to a low pressure discharge to permit return of the cam to neutral, means biasing said cam member to a neutral position, linkage means connecting said steering wheel means to said valve member to position said valve member in accordance with the desired radius of vehicle turn, and feedback linkage means adapted to be connected to said steering members for moving said valve member to the neutral position returning the cam member to neutral when the desired radius of turn is achieved.

4. A fluid system as defined in claim 3, including a source of control fluid and means connecting the same to said valve means, passage means connecting said valve means to said fluid operable means, said valve member in neutral connecting said passage means to low pressure, means for moving said cam member to neutral when said valve member is in neutral position, said valve member when displaced from neutral connecting said fluid source to said fluid operable means to bring said pump into stroke, said feedback linkage being constructed to move the valve member to neutral when the steering members reach the desired position to thereby connect said passage means to low pressure, and return the cam member to neutral terminating the flow of fluid from the pump to the actuator and arresting the actuator.

5. A fluid system as defined in claim 3, wherein there are two reciprocating piston actuators connected to said steering members, said conduit means including first and second conduits connecting the pump and said actuators for alternatively delivering fluid from the pump to the actuators and returning fluid from the actuators to the pump depending upon the direction of displacement of said cam member, said first conduit connected to one side of one of said actuators and the other side of the other actuator to cause opposite movement thereof, said second conduit being connected to the other side of said one actuator and the opposite side of said other actuator to cause when pressurized reverse movement of the actuators than when the first conduit is pressurized.

6. A vehicular power steering system, comprising: a rotatable multiple piston pump adapted to be driven by an engine, a cam member adjustable from neutral to vary the displacement of said pump, fluid operable means for positioning said cam member, at least one hydraulic cylinder and reciprocating piston actuator adapted to be connected to position steering members in the vehicle to vary the radius of turn of the vehicle, conduit means for delivering fluid from the pump to said actuator, a steering wheel means movable from a straight ahead position to left or right positions, valve means including a valve member movable from a neutral position in both directions to port fluid relative to said fluid operable means thereby to control the direction of movement of said cam member from neutral, linkage means connecting said steering wheel means to said valve member to position said valve member in accordance with the desired radius of vehicle turn, feedback linkage adapted to be connected to said steering members for moving said valve member to a position returning the cam member to neutral when the desired radius of turn is achieved, a high pressure safety valve responsive to excessive pressure in said conduit means for returning said cam member to neutral, said safety valve having a movable valve member for controlling the flow of fluid to said valve means, and relief valve means for moving said safety valve member to terminate the supply of control fluid to said fluid operable means.

References Cited

UNITED STATES PATENTS

| | | | |
|---|---|---|---|
| 2,552,604 | 5/1951 | Thoma | 60—52 |
| 2,614,644 | 10/1952 | Gustafson | 180—79.2 |
| 3,114,424 | 12/1963 | Voreaux | 180—6.3 |
| 3,202,238 | 8/1965 | Strader | 180—79.2 |
| 3,370,422 | 2/1968 | Carlson et al. | 60—52 |

LEO FRIAGLIA, *Primary Examiner.*

JOHN A. PEKAR, *Assistant Examiner.*

U.S. Cl. X.R.

60—52